Dec. 15, 1964 T. HENSE 3,161,854

DIGITAL CONVERSION AND STORAGE SYSTEM
(INPUT DEVICE FOR ELECTRONIC COMPUTERS)

Filed July 30, 1958 4 Sheets-Sheet 1

INVENTOR
THEO HENSE

BY Toulmin & Toulmin
ATTORNEYS

INVENTOR
THEO HENSE

BY Toulmin & Toulmin
ATTORNEYS

INVENTOR
THEO HENSE

BY Toulmin & Toulmin
ATTORNEYS

INVENTOR
THEO HENSE
BY Toulmin & Toulmin
ATTORNEYS

United States Patent Office 3,161,854

Patented Dec. 15, 1964

3,161,854

DIGITAL CONVERSION AND STORAGE SYSTEM (INPUT DEVICE FOR ELECTRONIC COMPUTERS)

Theo Hense, Wilhelmshaven, Germany, assignor to Olympia Werke AG., Wilhelmshaven, Germany Filed July 30, 1958, Ser. No. 752,105
Claims priority, application Germany Aug. 22, 1957
21 Claims. (Cl. 340—172.5)

This invention relates to a digital conversion and storage system and more particularly to a system of the decimal-to-binary conversion type which is suited as an input device for electronic computers.

Decimal-to-binary conversion and storage are well-known problems in input systems for high speed computing devices and are discussed, for instance, in "High-Speed Computing Devices" (HSCD) by Engineering Research Associates, Inc., published in 1950 by McGraw-Hill, in particular on pages 396 and 411 and following.

The known input devices for the purpose of converting decimal or decadic digits typed on a keyboard into dual code and temporarily storing the binary values, whereupon the latter are transferred as sequences or pulse groups to a computing device, comprise a number of coordinated contact arrangements which are actuated in order to convert the decadic digits to a sequence of voltage values which can be consecutively scanned by an electro-mechanical switch and are recorded intermediarily and temporarily as a sequence of code pulses on a mechanically moved information carrier or recorder. From the latter intermediary recorder, the values can then be consecutively scanned in a known manner and can be fed as successive pulse groups into a computing device.

After the dual combination of voltage values corresponding to typed-in decimal digits has been transferred to the aforesaid recorder of the known input device, the input key is again electro-mechanically released.

This method of storing the input values on a mechanically moved information carrier or recorder, which may be, for instance, a recording drum, involves considerable drawbacks which are particularly due to the fact that a series of electromechanical steps are required for storage of each digit and number. This causes losses of time, so that the typing-in velocity cannot be increased beyond certain limits. Furthermore, the electro-mechanical device is subject to relatively higher wear, since the scanning contact device must pick up each value of the dually distributed voltages at high speed. In addition, the contact means which are moved by the decimal keys must consist of at least five contacts, which fact naturally increases the required amount of materials and also the likelihood of disturbances and faults developed in the known systems.

It is, therefore, an object of my invention to provide a digital conversion and storage system suitable as an input system for electronic computers in particular by decimal-to-binary conversion and storage, which system requires a minimum of only a single step of electro-mechanical operation per digit to be put-in and stored, and permits a considerable reduction in the number of input contacts required in the system.

This object is attained and the drawbacks of the known devices are overcome by the digital conversion and storage system according to my invention, applied particularly as an electronic computer intake device, which system comprises means for initiating temporary storage, concurrently, of all coded signals (for instance up to four in number, if a binary code is used) which correspond to each decadic digit, in a matrix register with the aid of rotary selector switch means such as step-by-step switches or the like.

Rotary selector switches are described and illustrated, for instance, by Keister et al. in "The Design of Switching Circuits," published by Van Nostrand, 6th edition, page 179 et seq., in particular FIGURE 9–1.

More particularly, the system according to my invention comprises a 10-key keyboard, or automatically controlled means being the equivalent thereof, such as, for instance, a tape reader; at least one line-and-column matrix storage, register, rotary selector (step-by-step) switch means cooperating with the latter, and several sets of contacting means interposed between the keyboard, the storage register and the step-by-step switch means.

These basic components are connected in the system according to my invention in such a manner that actuation of any random input key to read in a decadic digit effects concurrently (*a*) a closing of that contact set which is associated with the actuated key, as well as a selection of the line storage leads which correspond to the read-in decimal digit, and (*b*) the angular displacement, by step-wise switching, of the rotary selector switch means from a given position to a next adjacent one in order to select and excite the next following column storage leads of the matrix register. Thereby, a single switching step of the rotary selector switch means permits to completely store the binary number corresponding to the read-in decadic digit.

Another particular feature of my invention facilitates the input of decimal fractions or integers and decimal fractions jointly. In the latter case, the integers will occupy, in a decadic number, the position to the left from a separating fractional mark, while the decimal fraction digits will occupy positions to the right of that mark, tenths occupying the first position to the right, hundredths the second, thousandths the third and so forth. It is well known that the fractional mark is a "decimal point" in Anglo-Saxon countries and a comma in most other countries. Where, therefore, hereinafter the word "comma" is used, for the sake of brevity it is meant to be understood as the equivalent of a "decimal point" separating integers and fractions in decadic numbers.

This last mentioned feature of my invention provides for input blocking means which blocks the typing-in operation as soon as all integers, i.e., positions to the left of the afore-mentioned "comma" has been completed, by interrupting the step-by-step switching current for such a time, until the "comma" has been typed in.

Blocking means can also be provided, according to another feature of my invention, to block a further input of all digits, irrespective of their position to the left or to the right of the comma, when the input capacity of the system has been exhausted.

According to another embodiment of my invention, the input system comprises two separate rotary selector switch means which cooperate with a comma position selection switch in such a manner that the number of ($n$) positions available for digits to be stored in a sole sequence, can be subdivided selectively at will to provide a desired number of ($i$) positions for the integers to the left of the comma, and the remaining number of ($n-i$) positions for decimal fraction digits to the right of the comma.

My invention will be better understood from the further description thereof in connection with the accompanying drawings in which FIGURE 1 is a schematical block diagram of the system according to my invention, showing certain features in detail;

Figures 2, 5A, 5B:
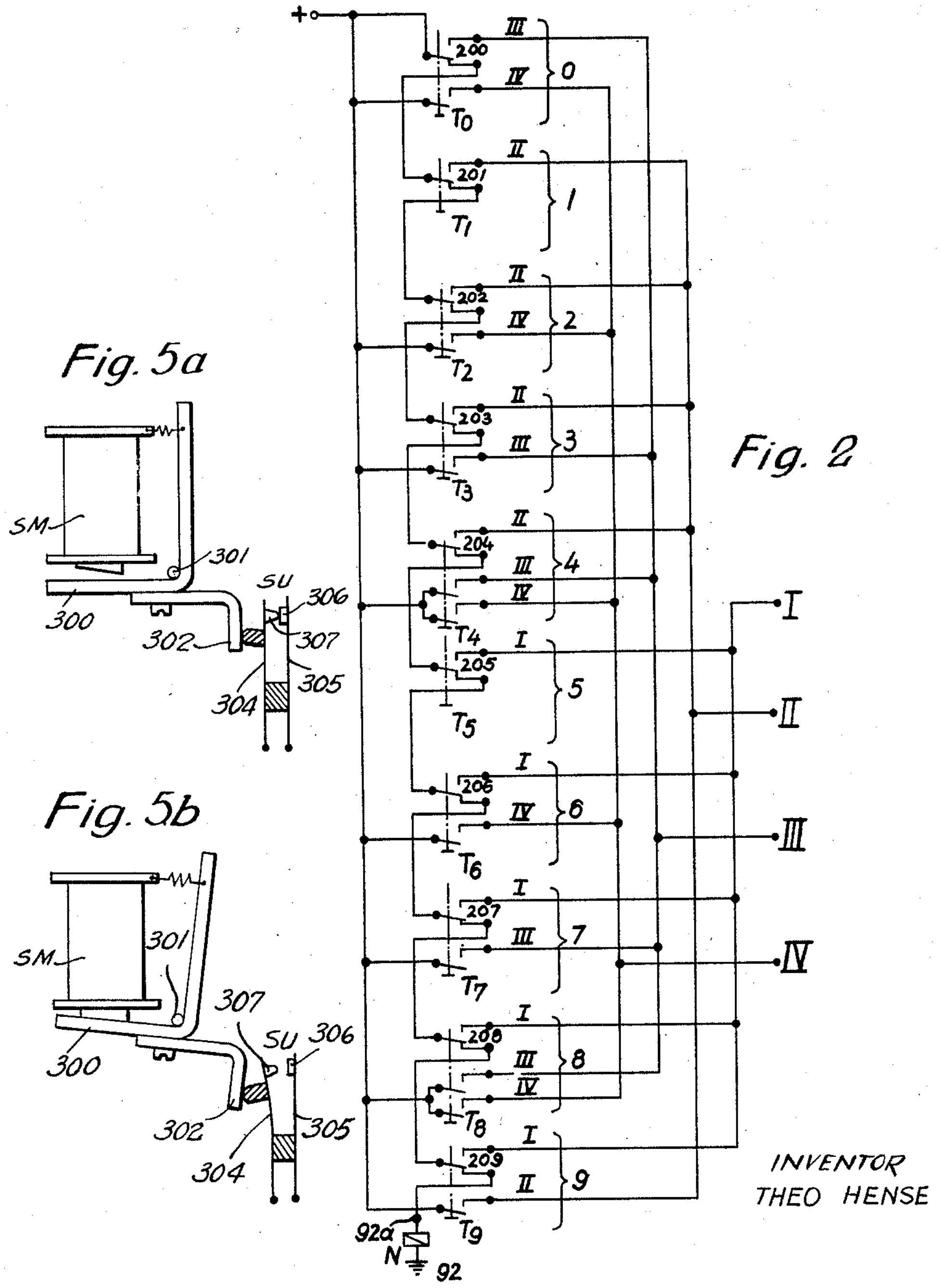
FIGURE 2 is a detailed wiring diagram of the decimal keyboard circuitry for typing-in the input information.

FIGURE 5*a* illustrates schematically the step magnet of a rotary selector switch (step-by-step switch) as used in the embodiments of the invention illustrated in the preceding figures, and the combination of a self-interrupting switch with this step magnet, wherein the step is in closed position; and FIGURE 5*b* is a view similar to that of FIGURE 5*a*, but with the self-interrupting switch in open position.

Figure 1:
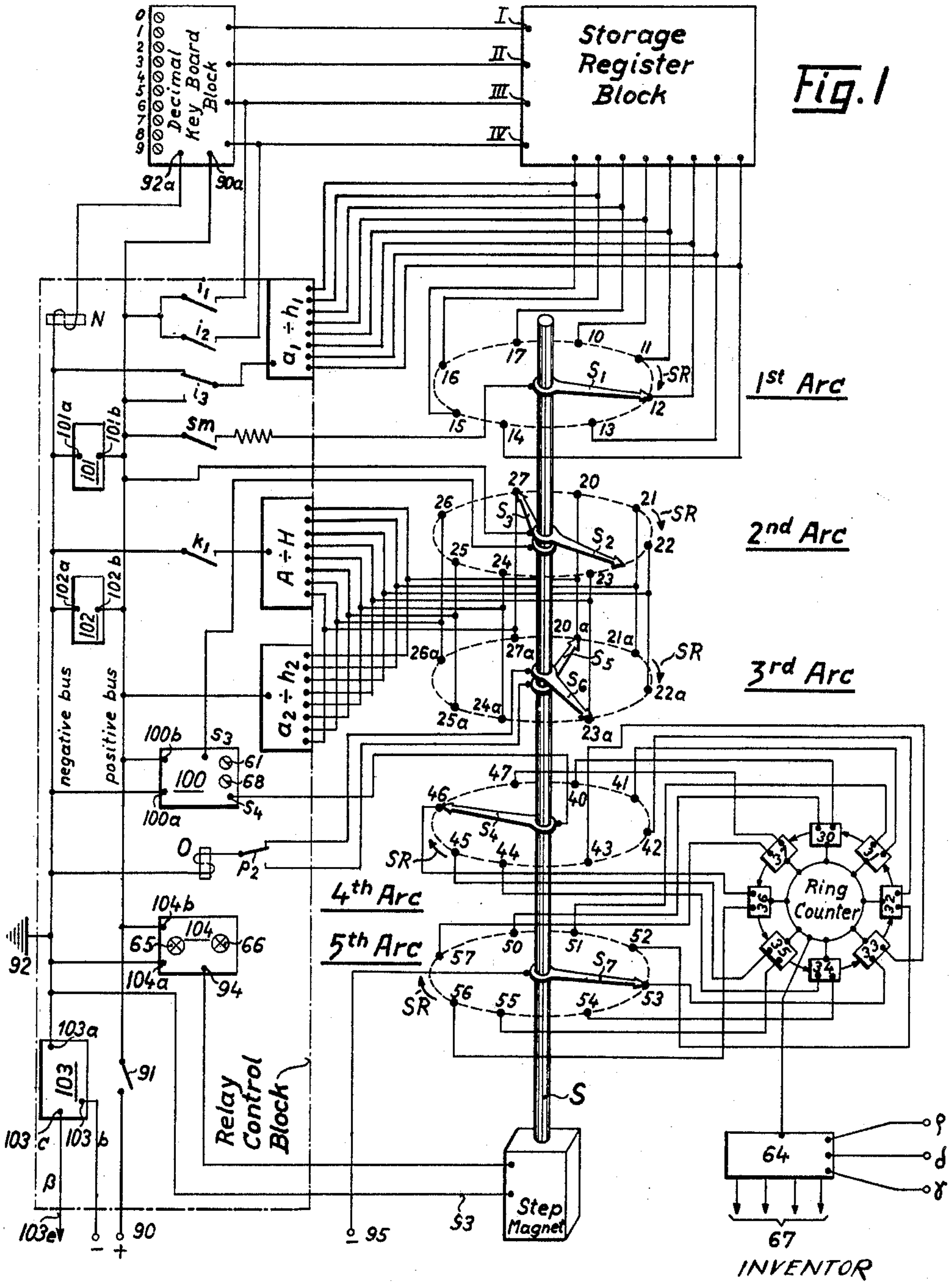
Figure 3:
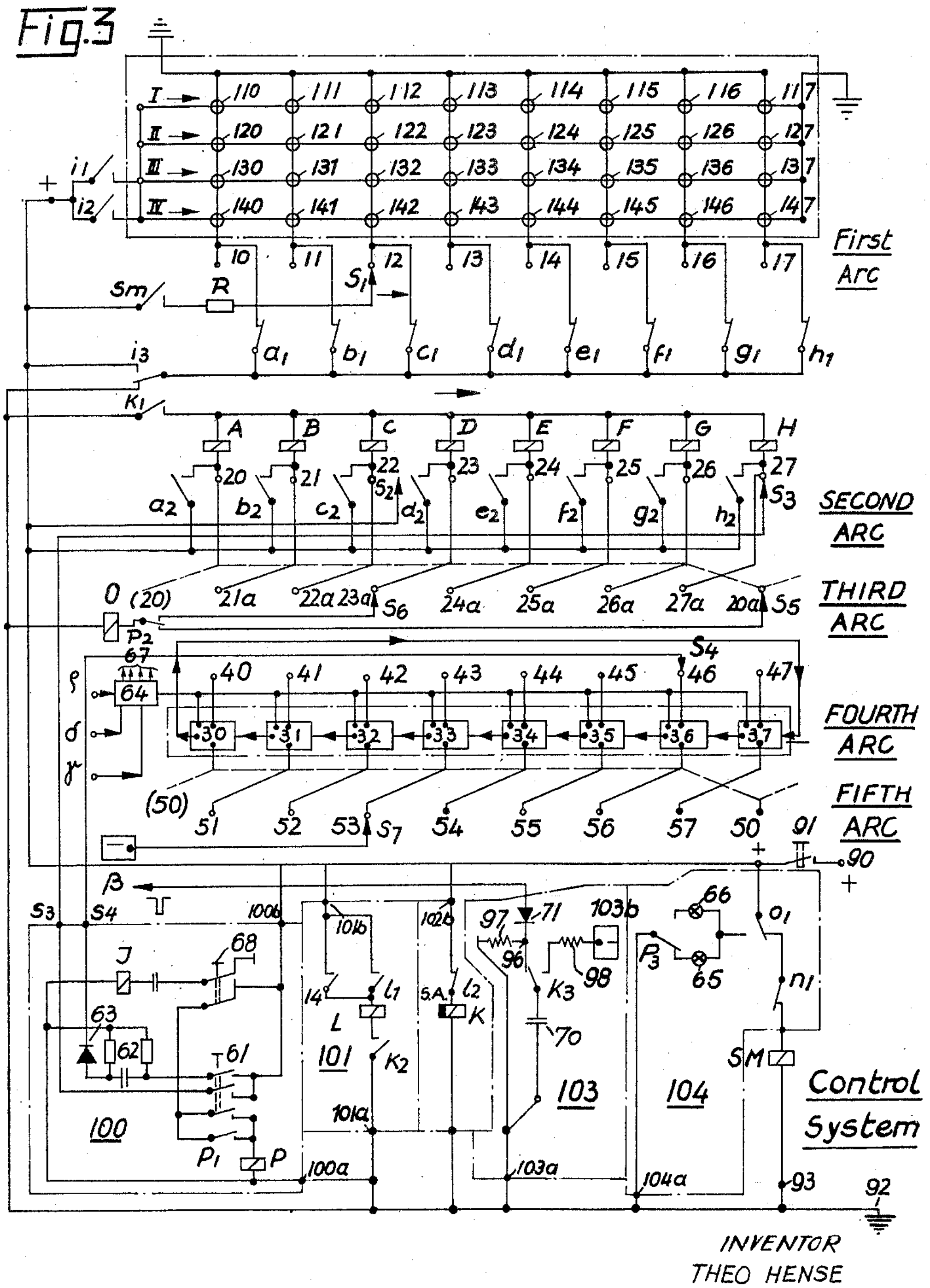
FIGURE 3 shows a detailed view of the wiring arrangement of the matrix register and control circuitry comprising a single rotary selector switch.

Referring now to the drawings in detail, the schematic block diagram of FIGURE 1 comprises a block designating the decimal keyboard which is shown in detail in FIGURE 2, another block designating the matrix storage register, a further block comprising the relay control system, rotary selector switch means consisting of a single five-arc step-by-step switch, and finally, a ring counter circuit, all of which parts are illustrated in detail in FIGURE 3.

Block 64 designates a reading-off device which does not form part of the present invention.

*The Keyboard (FIGURES 1 and 2)*

FIGURE 1, and more in detail FIGURE 2, show the keyboard block of the system according to my invention, which block comprises keys $T_0$ to $T_9$ for actuating switch elements 200 to 209, each serving for typing or reading in one of the decadic (decimal) digits 0, 1, 2, 3, . . . 7, 8 and 9.

Switch elements 20 to 29 consist of multiple-pole multiple-throw switches which are, for instance, operable by hand by means of depressing the aforesaid keys or by suitable automatic means. When in raised position, i.e., when no key is depressed, switch elements 20 to 29 are so positioned as to establish current flow between the positive terminal designated by 90 and ground at 92, or a negative terminal of a direct electric current source, as soon as main switch 91 is turned on. In the path of current flow from the keyboard block to ground at 92, there is located relay $N_{(n)}$, the coil N of which is energized as long as all keys remain in rest position (as illustrated in FIGURE 2), i.e., as long as no key is depressed.

In order to simplify the wiring diagrams, the relay coils and the armatures pertaining thereto are not illustrated next adjacent to each other, but, according to more recent practice, they are shown spaced conveniently from each other, while their cooperating relationship is indicated by the relay coils being designated by capital letters and the armature or armatures pertaining thereto being designated by the same small letters. For instance, coil P simultaneously actuates three armatures $p_1$, $p_2$, and $p_3$. All armatures are shown in the position adopted by them when their respective coils are not energized (inoperative position).

*The Storage Register (FIGURES 1 and 3)*

The uncontacted poles of switch elements 200 to 209 in FIGURE 2 are each connected to one of the four input terminals I, II, III, IV of the lines of a line and column matrix storage register (110–147) (FIGURE 3) which is provided at each line and column intersection with conventional magnetic storage means such as ferrite ring cores. A conventional magnetic storage register is described, for instance, in Patent 2,750,580 by Rabenda and Whitney.

The general functions of such registers are, for instance, described in HSCD supra, page 42, and comprise their use for storing, for instance, information converted from a decimal to a binary arithmetic system, and vice versa.

In the preferred use of the system according to the present invention, the register (110–147) participates in storing directly information composed of decimal digits in the form of the corresponding binary notations, preferably in the excess-3 code (which is explained in HSCD supra, page 205).

Apart from lines I–IV, register (110–147) comprises columns ending in column terminals 10 to 17. The register columns are also directly connected to circuit breaker means comprising relay-operated armatures $a_1$ to $h_1$.

*Step-by-Step Switch (FIGURES 1 and 3)*

The step-by-step switch illustrated in FIGURES 1 and 3 comprises five arcs of contact-terminals, the first of which arcs bears terminals 10 to 17; the second terminals 20*a* to 27*a*, each of which is converted to the correspondingly numbered terminal on the second arc; the fourth arc is formed by terminals 40 to 47 and the fifth arc by terminals 50 to 57, to which terminals various components of the system are connected as described hereinafter. Contact with the terminals is established successively and selectively by wipers $S_1$ to $S_7$ which are mounted on a rotable central shaft S. Step-by-step actuation of the switch is effected by a step magnet SM, which rotates shaft S in the direction indicated by arrows SR. The wipers are associated with the five arcs in the following manner:

(1) Wiper $S_1$ with the first arc;

(2) Wipers $S_2$ and $S_3$ with the second arc formed by terminals 20–27; wiper $S_2$ being so angularly disposed relative to wiper $S_1$ that it precedes the latter by half the distance between two contact terminals, on their respective arcs; at the same time contact arms $S_2$ and $S_3$ are displaced relative to each other so that the former precedes the latter by the distance of three-and-a-half terminals on the second arc; consequently, in making contact wiper $S_3$ precedes wiper $S_1$ by the distance of five terminals;

(3) Wipers $S_5$ and $S_6$ with the third arc, formed by terminals 20*a* to 27*a*, $S_6$ making contact one terminal ahead of $S_1$, and $S_5$ one terminal ahead of $S_3$, so that $S_5$ precedes $S_6$ by five terminals;

(4) Wiper $S_4$ with the above-mentioned fourth arc and so disposed for rotation about shaft S that it follows wipers $S_3$ and $S_5$ by two terminals; and finally (5) Wiper $S_7$ which makes contact with the terminals 50 to 57 on the fifth arc, and is always four steps ahead of (or trailing) wiper $S_4$ on the fourth arc (terminals 40–47). Of course, the term "ahead" means when shaft S rotates in the direction of arrow SR; rotation in the opposite sense meaning that the sequence of the contact arms is also inverted.

*Relay Control Circuitry (FIGURES 1 and 3)*

The relay control circuitry comprises a relay group comprising coils A–H and two sets of armatures $a_1$–$h_1$ and $a_2$–$h_2$. The first set of armatures controls current flow between the columns of the storage register via a relay switch armature $i_3$ to either positive potential at 90 or ground at 92. Armatures $a_2$ to $h_2$, which can all be cut off together by means of circuit-breaking armature $k_1$, serve to maintain selectively and individually coils A–H in energized condition by positive potential from 90. Each of relay coils A–H and of armatures $a_2$–$h_2$ are connected, parallel to each other, to one of contact terminals 20 to 27, respectively.

The relay control block further comprises a branched line from position potential 90 via parallelly connected relay switch armatures $i_1$ and $i_2$ to line input terminals III and IV, respectively, of the storage register.

It further comprises blocks 100, 101, 102, 103 and 104 (FIGURE 1) which are shown in detail in FIGURE 3. These blocks are hooked up via the negative bus to ground at 92 via their respective terminals 100*a*, 101*a*, 102*a*, 103*a* and 104*a*, and via another bus to positive potential at 90, via their respective terminals 100*b*, 101*b*, 102*b*, 104*b*. Block 103 is hooked up via terminal 103*b* to a source of negative potential.

The relay control circuitry of this block further comprises the hook-ups of the wipers $S_1$ to $S_6$, which are arranged as follows:

Wiper $S_1$ is connected via a resistor and a circuit make-and-break switch *sm* to positive potential at 90, switch *sm* being actuated by the aforesaid step magnet SM. The latter is hooked up at 93 to the ground bus and at 94 to block 104. In this latter block, energization of the step magnet SM is controlled by armature *n*, of relay N and by switch armature $o_1$, and is passed by current flow to the positive potential at 90, when the armatures $n_1$ and $o_1$ close the path between the latter and ground at 92.

Each time that the step magnet SM is deenergized due to $n_1$ (or $o_1$) interrupting current flow to 90, shaft S is caused to rotate by one step, i.e., the wipers are moved by the angular distance between one terminal on any one arc of the step-by-step switch to the next following terminal.

Wiper $S_2$ receives current through its permanent hook-up to the bus leading to positive potential at 90.

Wiper $S_3$ is hooked up at $s_3$ to block 100 and receives current through connection to positive potential whenever an input key T of switch 61 in block 100 is depressed.

Wiper $S_4$ is also hooked up to block 100 at $s_4$, and receives current through the same actuation of switch 61 but via a capacitor 62 and rectifier means 63, also in block 100.

Wiper $S_5$ is connected via one of the poles of a double pole single throw switch constituted by armature $p_2$ of relay P ($p_1$, $p_2$, $p_3$) and from this through coil O of the relay O ($o_1$, $o_2$) to ground at 92.

Wiper $S_6$ is connected to the opposite pole of the double throw single throw switch constituted by armature $p_2$.

Finally, wiper $S_7$ is permanently connected to a negative potential at 95.

The details, partly mentioned hereinbefore, of block 100 are shown in FIGURE 3, and comprises two switches 61 and 61 operable, for instance, by depressing keys. The functions of these key-operated switches will be explained hereinafter. Switch 61 is a triple pole-single throw switch which supplies current flow firstly to coil P of relay P ($p_1$, $p_2$, $p_3$), secondly to wiper $S_3$, and thirdly to wiper $S_4$ via the aforementioned capacitor 62 and rectifier 63. Block 100 further comprises a calculator switch 68, the function of which will be explained further below which, when depressed, cuts off relay coil P, and establishes current flow through capacitor 69 and coil I of relay I ($i_1$, $i_2$, $i_3$, $i_4$) to ground.

Block 101 comprises, connected to positive terminal 101*b*, two parallel armature switches $i_4$ and $l_1$ responsive to relay coil I and L, respectively, and joined to a line through coil L of relay L ($l_1$, $l_2$) and from there via switch armature $k_2$ to the negative terminal 101*a*.

Block 102 leads from negative terminal 102*a* via a coil K of slow release type relay K ($k_1$, $k_2$, $k_3$) and switch armature $l_2$ to positive terminal 102*b*. Relays of the aforesaid type are described, for instance, by Keister et al., supra, under "Poles and Slow Action Relays," page 33.

Block 103 comprises branch line 103*c* from ground terminal 103*a* via capacitor 70 and one pole of double pole switch armature $k_3$ to point 96 and from there via rectifier means 73 to output line 103*e* for negative pulses, $\beta$; and branch line 103*d* via resistor 97 to point 96. The other pole of switch armature $k_3$ is connected to negative potential at 103*b* via resistor 98.

Block 104 comprises, apart from the elements described hereinbefore, a line from negative 104*a* to positive 104*b* via switch armature $p_3$, parallelly connected lamps 65 and 66 and the above mentioned double pole switch armature $o_2$.

Finally, as illustrated in FIGURES 1 and 3, the embodiment of the system according to the invention comprises a ring counter RC, preferably of the thyratron type (see HSCD supra, page 22), and composed of trigger sections 30 to 37. The cathode input of each section is connected to contact terminals 50 to 57 on the fifth arc of the step-by-step switch, while the plate of each section is connected to contact terminals 40 to 47 on the fourth arc of the same switch.

This ring counter RC is part of the "comma" input and calculation starting section, which also comprises a "comma" key T for actuating the above described single-pole multi-throw switch 61 which makes and breaks current flow from positive terminal 100*b*, firstly, in a capacitor 62 and rectifier means 63, preferably in the form of a diode or dry plate semi-conducting rectifier, via wiper $S_4$ to the plates of triggers 30–37 of ring counter RC, and, secondly, to contact terminals 20–27 via wiper $S_3$, as has been described above.

*Operation*

In order to prepare the entire system for the input of numbers, the main switch 91 is turned on and current flows are established simultaneously through the positive bus and (+) terminal 90*a* of the keyboard block, through switches 200 to 209 in the latter, which are all in inoperative position, through (−) terminal 92*a* of the keyboard, and relay coil N, energizing the latter, and ground at 92. Energization of coil N opens armature $n_1$ and prevents energization of step magnet SM. The step-by-step switch, therefore, remains inoperative.

At the same time current flows between terminals 102*a* and 102*b* via slow action relay coil K and armature $l_2$ which is in closed position as long as relay coil L remains de-energized. Energization of coil K causes armatures $k_1$ and $k_2$ to close, and $k_3$ to switch from the left to the right hand pole in block 103 (FIGURE 3). A charge is thereby built up on capacitor 70.

The system is now ready for typing in the first decimal digit by depression or similar actuation of one of keys $T_0$ to $T_9$.

Depending on the digit which is "typed" manually or automatically on one of digit input keys $T_0$ to $T_9$, voltage is applied to a selected number of line input terminals I to IV of the storage register, so that a register half current having an intensity of $J/2$ is generated in all storage cores pertaining to the respective line or lines.

At the same time, depression of one of the keys $T_0$ to $T_9$ causes interruption of current flow through relay N and consequently closing of armature $n_1$, whereby step magnet SM is energized to switch the step-by-step switch wipers $S_1$ to $S_7$ by a single step in the direction of arrow SR.

Due to the latter movement of all wipers of the step-by-step switch, (*a*) Wiper $S_2$ which precedes wiper $S_1$ by about half the distance, between two adjacent terminals, contacts one of the terminals on the second arc, for instance, as in FIGURE 3, contact 22. Current flow is caused between terminals 92 and 90 in armature $k_1$ which is still closed, coil C, wiper $S_2$ and closed main switch 91. Thereby, relay C is energized and self-maintained in an energized state by closing armature $c_2$. At the same time, armature $c_1$ is also actuated by relay C, and caused to interrupt the branch connection of column 112–122–132–142 of the matrix register to ground via armature $i_3$, and 92.

(*b*) Shortly afterwards, wiper $S_1$ makes contact at terminal 12 (this instant is illustrated in FIGURE 3) and, since energization of step magnet SM has already caused armature *sm* to close connection to positive current potential at $90_1$, a current having the intensity $J/2$ flows through cores 112, 122, 132 and 142, i.e., through the register column connected to contact terminal 12.

(*c*) Since, as has been mentioned above, current is flowing also through a selected number of register lines I–IV, storage of binary notations takes place, preferably according to the excess-3 code, in those cores of the matrix register which are simultaneously passed by line and by column currents; i.e., in which the intensity rises to the coincidence value $2J/2$.

Now, as the depressed digit input key is released, current is caused again to flow through relay N. Thereby armature $n_1$ opens and interrupts energization of step magnet SM, so that armature *sm* also interrupts current flow to contact terminal K and wiper $S_1$.

A numerical example will be given to explain still more clearly the input operation up to this stage. It shall be assumed that the number 247.8531 (or replacing the decimal point by a comma as defined above, 247,8531) is to be typed into the keyboard of FIGURE 2, and transferred from there and converted into binary code to the matrix register of FIGURE 3 to be stored therein.

First, key $T_2$ is depressed, which corresponds to the first decimal digit "2," and double-pole, double-throw switch 202 is caused to send current into the lines of input terminals II and IV of the matrix register. Concurrently therewith, column 112–122–132–142 of the matrix register receives current in the manner described above, via wiper $S_1$ of the step-by-step switch.

Figure 4:
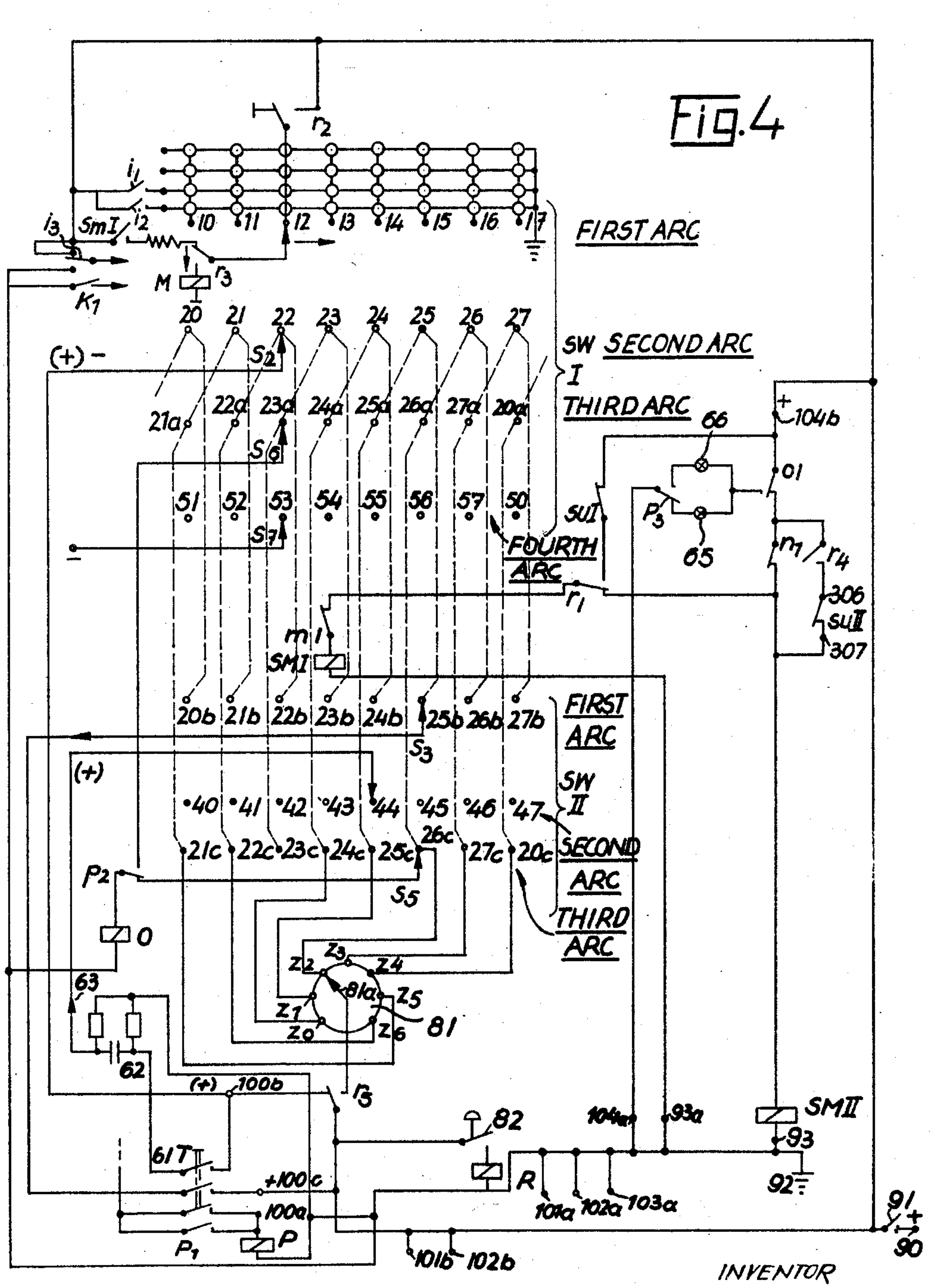
FIGURE 4 shows another embodiment of the system according to the invention comprising two rotary selector switches.

Decimal digit "4" is then loaded into the line terminals I, II, III and IV through actuation of key $T_4$, and a current $J/2$ is concurrently sent into column 113–123–133–143 of the matrix register, wipers $S_2$ and $S_1$ having moved one step further in the direction of arrow SR (FIGURES 3 and 4).

Thereafter, digit "7" is loaded into lines I and III by actuation of key $T_7$ at their intersection with column 114–124–134–144 due to the fact that wipers $S_2$ and $S_1$ have progressed one further step. The number portion before the comma, i.e., "247" has now been stored in the matrix register.

At this instant, i.e., after digit "7" has been stored, relays C, D and E are energized and maintained in that state via armatures $c_2$, $d_2$, and $e_2$ in the manner described above with regard to relay C, armatures $c_1$, $d_1$ and $e_1$ are open, and wiper $S_5$ of the step-by-step switch, which is ahead of wiper $S_1$ by five steps, has reached contact terminal 22*a* on the third arc of the step-by-step switch. Thereby, current flow is established between ground at 92 and positive potential at 90 via relay O, armature $p_2$ which is in rest position (i.e., with relay P unenergized), wiper $S_5$, terminal 22*a* and closed armature $c_2$.

This current flow now energizes relay O and causes armature $o_1$ to switch to contact with the left hand (in FIGURE 3) pole and causes indicator lamp 65 to light up, and indicate that comma input key T must be depressed manually, or actuated automatically. At the same time, shifting of armature $o_1$ interrupts current flow through step magnet SM and makes further steps of the step-by-step switch impossible for the time being.

An auxiliary known blocking device may be interposed here as an additional safeguard against further actuation of the step-by-step switch, for instance, a stop rail may be moved by relay O below the keys $T_0$ to $T_9$. It should be mentioned here that the presently described system is adapted for the input of seven digit numbers of which three digits are before (i.e., to the left of) the decimal-comma, and four behind the same. This is due to the fact that wiper $S_5$ is adjusted to precede wiper $S_1$ by five steps. If it would precede $S_1$ by only three steps, two more digits, i.e., a total of five, could be inserted before the comma; if $S_5$ would precede $S_1$ by only four steps, a number consisting of only two digits to the left of the comma could be loaded into the system, etc. If $S_5$ precedes $S_1$ by $n$ steps, $(8-n)$ digits can be loaded before the comma position is reached and further input blocked.

The "comma" is now inserted in the matrix register in the following manner:

(*d*) Comma input key 61 is actuated and causes current flow between (−) terminal 100*a* and (+) terminal 100*b* through relay P, thereby energizing the latter. Relay P closes armatures $p_1$ and thereby maintains itself energized by current flow to positive terminal 100*b*. At the same time, armature $p_2$ is shifted to its opposite contact, thereby interrupting current flow between 90 and 92 via wiper $S_5$ and de-energizing relay O, as well as preparing a later current flow through wiper $S_6$ during the insertion of the digits succeeding the comma. Armature O thereupon returns to its inoperative position, as illustrated in block 104 in FIGURE 3, armature $p_3$ is switched to its opposite pole, and lamp 65 is extinguished.

(*e*) Wiper $S_3$ has reached contact terminal 21 on the second arc, since it is also five steps ahead of wiper $S_1$ which is now at contact terminal 14 on the first arc, and $S_3$ now establishes current flow, upon comma key T being depressed, between terminals 100*b*, $s_3$, B, *k*, and 92. Thereby, relay coil B is energized and closes armature $b_2$, so as to maintain itself energized.

(*f*) Upon actuation of comma key switch 61, capacitor 62 is connected with position terminal 100*b* and charged a directed pulse is caused to pass via rectifier 63 through wiper $S_4$ which, by the way, is four steps ahead of wiper $S_1$, and now making contact at contact terminal 40 on the fourth arc of the step-by-step switch, into the flip-flop trigger element 30 of ring counter RC. The ring counter RC is thus primed and starts operating at once from this point of element 30, as soon as the command or programming section of a computing device (not shown) sends clock pulses $\rho$ to the line ring counter 64 which is schematically shown in FIGURE 3. After every fourth clock pulse $\rho$, the last mentioned ring counter 64 will then pass a stepping pulse, in a manner known per se to the column ring counter RC.

The function of the line ring counter 64 in reading out information from the input storage register will be explained further below, although this function does not form part of the present invention.

After the "comma" insertion has been achieved in the above described manner, the positions following (i.e., to the right of) the "comma" can be loaded into the register via armature $p_2$ and wiper $S_6$. In the present example there are four such positions of decimal fractions. For this purpose, relays F, G, H and A are successively energized by contact being made by wiper $S_2$ in the manner described above, and these relays remain self-energized by way of their switch armatures $f_2$, $g_2$, $h_2$, and $a_2$. By way of wiper $S_1$, contact is then made in the manner described above, in successive order via terminals 15, 16, 17 and 10, with the corresponding column cores of the register, while the dually distributed line currents corresponding, for instance, to the digits 8, 5, 3 and 1 in the above-mentioned numerical example, being the positions after the comma, are loaded by means of depressing the corresponding keys of the keyboard at the intersections where line and and column pulses coincide to attain the total current intensity of $2J/2$.

When the digit corresponding to the fourth, i.e., the last position after the comma has been loaded into the register, wiper $S_6$ contacts terminal 21, which had been connected to voltage by wiper $S_3$ during the insertion of the comma, whereby relay B had also been energized.

Now, upon wiper $S_6$ making the aforesaid contact, relay O will again become energized via terminal 21 and armature $b_2$, and attracts armature $o_1$ to break contact between 104*b* and 94. Thereby, further loading of information is made again impossible and lamp 66 is lit up to indicate that the input operation is terminated. This is effected because relay P is still energized and, therefore, armature $p_1$ is closed, while $p_3$ applies a zero potential to lamp 66.

If less positions have been filled after (to the right of) a "comma," than would be permissible due to the maximal capacity provided for in the register, the remaining positions must be filled by the digit 0. This is effected in the following manner:

After the last digit, pertaining to the position furthest to the right of the comma in the number being loaded, has been inserted, calculator key 68 is actuated, which instructs the machine to "Calculate!" This brings about the following occurrences:

(*g*) The polarized relay J attracts its armatures briefly to the vision potential on the plates of capacitor 69, and, through the closing of armatures $i_1$ and $i_2$, line currents are inserted by way of terminals III and IV into the corresponding line loops 130–137 and 140–147. Simultaneously, armature $i_3$ is attracted and currents are sent via those of armatures $a_1$ to $h_1$ inclusive, that still make contact into the corresponding column loops, thereby carrying the coincident currents at all intersections of the above mentioned two line loops, where no digits have been loaded before, to excite the cores at the intersections and effect storage of the digit 0 coded according to the excess-3 code. When reading each of these register columns from the top to the bottom (in FIGURE 3), this corresponds to the binary value for digit 0, namely 0011.

(*h*) Relay L is energized by the brief closing of armature $i_4$ and is maintained in that state via contact armatures $l_1$ and $k_2$, since in spite of the fact that energization of relay L causes armature $l_2$ to break contact and de-energize relay K, the latter being a slow action relay, only releases $k_2$ somewhat later.

(*i*) Subsequently, armatures $k_1$ and $k_2$ are opened for a short time, thereby de-energizing all relays A to H inclusive, which allow their armatures to return to the rest positions shown in FIGURE 3.

(*k*) Switch armature $k_3$ is briefly switched back to the pole below 96, and, due to the charging of capacitor 70 via rectifier 71, a negative pulse $\beta$ is sent off to a command transfer system or the like of the above-mentioned computer to which the input system pertains; this pulse $\beta$ informs the computer that "input is terminated."

(*l*) Current flow from terminal **100*b*** through relay coil P is interrupted, and armatures $p_1$, $p_2$, and $p_3$ return to their initial positions.

(*m*) Finally, as slow action relay coil K has become completely de-energized, armature $k_2$ opens and relay L is de-energized, whereupon relay K is re-energized since armature $l_2$ returns to its rest position in which it re-establishes current flow between terminals **102*a* and 102*b***.

Now, although an output system does not form part of my invention, the hookup of such a conventional system shall be briefly described hereinafter to completely illustrate the usage of the input system according to my present invention.

Upon its arrival at the command system of the machine, the negative pulse $\beta$ causes, in a manner known per se (and described for instance in my pending application Serial No. 640,282, filed February 14, 1957, the track starting pulse $\delta$ of a memorizing means such as a magnetic storage drum or the like, to contact the first trigger stage of line ring counter 64 and to initiate the reading of values and insertion from the storage register 110–147 into the magnetic drum. Steered by the clock pulses $\rho$, the ring counter 64 now rotates electrically and scans the lines of the storage register column by column.

For the purpose of reading the storage register 110–147, the exit terminals of line ring counter 64 are connected during the reading of stored values from the register, to line loops 110–117, 120–127, 130–137, and 140–147, respectively, at terminals I, II, III and IV, in such a manner that reading currents are generated in the aforesaid exit terminals in the reverse sequence to that of loading the register.

A first current flow contrary to the direction indicated by the arrows at I, II, III and IV is therefore generated in line loop 110–117, then, at the next following clock pulse $\rho$, a second current flow in loop 120—127, and so forth. During the duration of these four reading pulses in the line loops, the trigger stage 30 produces a reading current in the column loop 110–120–130–140, which also flows in opposite direction to the original storing current. At the end of the fourth line pulse, the column ring counter is switched to stage 37 thereof, and reading continues in the sequence of the line connected to terminals IV, III, II and I, while column loop 117–127–137–147 is now excited for reading. It should be noted that during this scanning of the register, the ring counter switches in opposite direction to the step-by-step switch.

As has been mentioned before, every fourth clock pulse switches the column ring counter RC to the next following stage, beginning with the trigger stage which was primed by way of wiper $S_4$. After 28 clock pulses, the entire storage register in the embodiment shown in FIGURE 3, has been scanned, and the line ring counter 64 is switched off again with the aid of an extinguishing pulse $\gamma$ sent from the command system simultaneously to all four trigger stages of the line ring counter 64.

When being extinguished, the line ring counter 64 sends one further pulse to the column ring counter RC, whereby the last switched trigger of that counter is returned to its inoperative state. However, due to this fact, the next following trigger cannot be switched, because the grid of the blocked tube of trigger 31 is maintained at a high negative potential by way of wiper $S_7$.

Of course, the column ring counter may also be extinguished by using the extinguishing pulse $\gamma$ of the command transfer system directly.

In the embodiment of the input system according to my invention, illustrated in FIGURE 6, I provide for the possibility to select, at will, that position out of a given number of digits (equal to the number of columns of my matrix storage register), in which I wish to place the "comma" which is to separate the positions of integers from the positions of decimal fractions. If, therefore, I have a register of *n* columns, I can for instance use 3 positions to the left of the comma, the next following position for the insertion of the comma, and the remaining ($n—4$) positions for the loading of decimal fraction digits.

Or I can switch my arrangement at will so as to use 5 positions for integers, i.e., to the left of the comma, one for the comma, and the remaining ($n—6$) positions for the digits representing tenths, hundredths, etc.

Now, in the first embodiment shown in FIGURES 2 and 3, the storage register is provided with 8 loading columns corresponding to terminals 10 to 17 (i.e., $n=8$). In the numerical example given further above, three columns were used for the positions of integers, one for the comma, and the remaining $(8—4)=4$ positions for digits to the right of the comma, representing tenths, hundredths, thousandths, and ten-thousandths.

In the embodiment shown in FIGURE 4, the input system also comprises a storage register of eight columns. However, in this embodiment of the system according to the invention, it is possible to select at will the position in which the comma is to be inserted. Thus I can insert the comma in a given calculation in the second, the third, the fourth, the fifth, or the sixth or seventh position. Accordingly, I can load digits corresponding to integers into from one to six columns, and decimal fraction digits into from six columns to one column, always depending on where I choose to place the comma. If I wish to use no comma at all, I can even load eight digits representing integers (or exclusively decimal fractions) into the storage register.

For the above purpose, the embodiment of FIGURE 4 comprises the following changes in comparison with the arrangement of FIGURES 2 and 3:

(1) Instead of a single step-by-step switch, two step-by-step switches SW–I and SW–II are provided, of which the switch SW–I comprises wipes $S_1$ and contact terminals 10 to 17 on a first arc, wiper $S_2$ and contact terminals 20 to 27 on a second arc, wiper $S_6$ and contact terminals **20*a* to 27*a* on a third arc, and wiper $S_7$ and contact terminals 50 to 57** on a fourth arc.

The second step-by-step switch SW–II comprises wiper $S_3$ and contact terminals **20*b* to 27*b* on a first arc, each of the latter contacts being connected directly to the corresponding one of contacts 20 to 27**, and being wiped in synchronism with the latter contacts; furthermore, switch SW–II comprises wiper $S_4$ and contact terminals 40 to 47 on a second arc, and wiper $S_5$ and contact terminals 20c to 27c on a third arc of this second switch, contact terminals 20c to 27c being in synchronism with contact terminals 20a to 27a, so that they will be reached, in the same instant as the latter terminals, one step ahead of terminals 20 to 27 and 20b to 27b. The interconnections between these various contact terminals are indicated by dashed lines in FIGURE 4. The circuit elements connected to these terminals of each arc remain unchanged as illustrated in FIGURES 2 to 5, and all wipers have the same functions as in the first embodiment.

(2) As a safeguard against faulty switching during the comma pre-selection, wipers $S_2$ and $S_4$ are connected to positive potential at 90 via a switch armature $r_5$ of a relay R ($r_1$, $r_2$, $r_3$, $r_4$, $r_5$). This relay plays a part in the selection of the comma position, and its coil R is energizable by depressing comma selection key 82, as shall be presently described.

(3) A common selection switch 81 is provided for either manual or automatic selection of the number of positions after (i.e., to the right of) the comma, which selection can range, in the embodiments illustrated by way of example only, from $Z_0$ to $Z_6$. Each of the contact terminals of this switch is connected to one of contact terminals 20c to 27c, one of the latter, in this instance terminal 23c, remaining interconnected to switch 81, and constituting the "home" terminal of rotary selector switch SW–II.

(4) Each of step-by-step switches SW–I and SW–II is provided with a step magnet SM–I and SM–II, respectively, and each of the latter is provided with a self-breaking switch means *su*–I and *su*–II. The latter means are automatically operated by the respective step magnets, as illustrated in FIGURES 5a and 5b.

In FIGURE 5a the step magnet is in inoperative condition and its armature 300, which is pivotable about pin 301, urges with its right arm 302 the contact arm 304 of self-breaking switch *su* against the stationary contact 305. Thereby, electric current flows from point 305 to 307.

In FIGURE 5b, the step magnet is energized and attracts armature 300, thereby pivoting the same about 301. Arm 302 is thereby moved away from fixed contact 305 of self-breaking switch *su*, and causes spring 308 to pull arm 304 out of contact with 305, thereby interrupting current flow between terminals 306 and 307.

Since, in the embodiment of FIGURE 4, the switch *su* can be interposed temporarily in the path of current flow energizing the step magnet, the step magnet will be alternately energized and deenergized, thereby causing a step-wise action on the shaft of the rotary selector switch to which it pertains, and on its armature, *sm*–I or *sm*–II, as the case may be. This step-wise action will be further explained below.

(5) Switch armatures $r_2$, $r_3$, are adapted for inverting the direction of current flow through wiper $S_1$, and through the register column $S_1$ happens to contact, whenever comma selection key 82 is depressed, and to energize in that event a relay coil M which then actuates its contact armature $m_1$, interrupting actuation of step-by-step switch SM–I. Armataure $r_2$ is arranged at a register column chosen at random, and the respective contact terminal of that column (for instance terminal 12 in FIGURE 4) thus becomes the home terminal for step-by-step switch SW–I, relative to which home position the wipers of switch SW–II can be displaced, at will, according to the position given wiper 81a of switch 81.

The arrangement illustrated in FIGURE 4 is operated in the following manner:

The system is prepared for operation by turning on main switch 91, whereby coil N is energized and switch armature $n_1$ (FIGURE 2). Before a given decadic number is loaded into the system, the desired number of positions to the right of the comma, and, consequently, the column into which the latter is to be inserted, is selected by, for instance, manually, adjusting comma selection switch 81. This switch is a conventional 7-pole switch adapted for manual or automatic adjusting.

In the example of FIGURE 4, the contact wiper 81a of switch 81 is positioned on contact $Z_2$, which signifies that five positions can be filled with digits before the comma, the comma occupies the sixth position, and two positions remain for decimal fractions (tenths and hundredths) to the right, i.e., after the comma. Thereafter, comma selection key 82 is depressed, whereby the following occurrences are initiated:

(*a*) Relay R is energized and attracts armature $r_5$ to cause current flow through switch 81 and via wiper 81a through terminal $Z_2$ thereof.

(*b*) The exciting circuit, from 93a to 104b, of step magnet of the first step-by-step switch SW–I is closed via armatures $m_1$, $r_1$, and *su*–I. Step magnet SM–I rotates the shaft of switch SW–I by means of the action of self-breaking switch *su*–I, as explained in connection with FIGURES 5a and 5b, until wiper $S_1$ of this switch reaches contact terminal 12.

Since switch armature $r_2$ is provided in the example of FIGURE 4 at the opposite end of the register column pertaining to this terminal and is switched to contact its positive pole, the armature $r_3$ has also been shifted to its operative position due to the energization of relay coil R, current flow takes place between positive potential at 90 and ground at 92 via $r_2$, $12_1$, $S_1$, $r_3$ and relay coil M. The latter is thereby energized and opens armature $m_1$, whereby step magnet SM–I is de-energized and step-by-step switch SW–I is arrested in this, its home position.

If armature $m_3$ had been provided at another column, the terminal pertaining to that other column would determine the home position of switch SW–I.

(*c*) Concurrently with the occurrences described under (*b*) above, the existing circuit for step magnet SM–II of switch SW–II is also closed via switch elements $o_1$, $r_4$ and *su*–II, due to the fact that armature $r_4$ is closed when coil R is energized. The same step-wise actuation of this switch SW–II takes place as described in connection with FIGURES 5a and 5b, until wiper $S_5$ of this switch reaches contact terminal 26 which is directly connected to terminal Z2 of comma selector switch 81, to which wiper 81a is adjusted as stated initially. Contact of $S_5$ with terminal 26 closes the exciting circuit of relay coil O between 90 and 92 via $p_2$, $S_5$, 26, Z2, 81a, and $r_5$. Energization of coil O switches armature $o_1$, thereby interrupting current flow through step magnet SM–II and arresting switch SW–II, while simultaneously causing lamp 65 to light up via armature $p_3$ and terminal 104a, thus indicating that the comma pre-selection is terminated.

(*d*) The comma selection key of switch 82 is then released, and energization of coil R interrupted. All armatures attracted by this coil, i.e., $r_1$ to $m_5$, return to their inoperative positions.

Wipers $S_3$, $S_4$ and $S_5$ have now been given the desired angular displacement relative to wipers $S_1$, $S_2$, $S_6$ and $S_7$, which is required to place the comma selection in the desired sixth position counting from the left in any given number, and the entire system is ready for typing in the first number.

The operation of all parts during the insertion of the numbers is exactly the same as described with regard to the first embodiment of the invention.

A very important advantage of the input system according to my invention resides in the fact that a single electro-mechanical step is required in storing a given decimal digit in the form of a 4-digit binary numeral in excess-3 code.

It will be understood that this invention is susceptible to modification in order to adapt it to different usages and conditions and, accordingly, it is desired to comprehend such modifications within this invention as may fall within the scope of the appended claims.

What is claimed is:

1. An input system for digital conversion and storage of information destined as input data for an electronic computing machine, comprising, key-actuated switch means including ten keys for reading in decimal digits, a circuit network including ten inputs connected to said keys and four outputs, for decimal-binary conversion of keyed input signals a matrix line-and-column storage register comprising four lines connected to said four outputs of said network to receive said decimal digits in the form of from 0 to 4 simultaneous currents corresponding to a binary code from said key-actuated switch means, rotary step-by-step selector switch means connected in succession to all of the columns of said storage register, said rotary selector switch means connected to said key actuated switch means so as to become excited and to carry out a one-step angular displacement at the reading in of every decimal digit on said key-actuated switch means and to contact at every such step a next following column of said storage register and pass a current therethrough, thereby storing said decimal digit in the form of four binary digits at those line-and-column intersections where said column current coincides with a line current.

2. An input system for loading numbers into an electronic computer in the form of binary coded values, comprising a ten-key keyboard for the selective input of decadic digits 0, 1, 2, 3, . . . 8, 9; ten contactor switch means associated with each of the keys of said keyboard, a circuit network having ten inputs respectively connected to said contactor switch means and four outputs for decimal-binary conversion of keyed input signals, a matrix storage register comprising four lines connected to the contactor switch means of said keyboard, and a plurality of columns, and a bistable storage element at each intersection of said lines and columns; at least one step-by-step switch means adapted for step-wise advance and comprising a plurality of arcs of terminals and wipers adapted for successively establishing contact with certain terminals on determined arcs, the terminals of one of such arcs being connected to the columns of said storage register, means for causing step-by-step actuation of said wipers and connected to said keyboard in a manner responsive to each input of a decimal digit on said keyboard, a relay control group comprising means for inserting a comma at a given column of said register, and means for reading out stored information from said register by scanning the lines and columns of the same and transferring the read-out data to said electronic computer.

3. In an input system for loading data in the form of decadic numbers into an electronic computer, in which the decadic digits inserted in a ten-key keyboard, each key of which keyboard corresponds to one of the decadic digits 0, 1, 2, . . . 8, 9, are transferred after temporary storage in binary-coded form as successive pulse groups to the calculating section of the computer, the improvement of, in combination, ten contactor switch sets each of which comprises contactors and is associated with one of the ten keys of said keyboard, a matrix storage register comprising four line means and a plurality of column means and a bi-stable storage element at each intersection of one of said line means with one of said column means, and at least one step-by-step switching means adapted for step-wise advance, electrical circuit means connecting said contactor switch sets to said four line means in such a manner that upon actuation of one of said keys of said keyboard certain contactors of the respective associated contactor switch set establish current flow through a determined group of said four line means corresponding to a binary code value equivalent to the decadic digit corresponding to the actuated key, and an electrical control circuit connecting said contactor switch sets to said step-by-step switching means so that actuation of said certain contactors of said last-mentioned set will simultaneously advance said step-by-step switching means by one step and thereby excite those of the storage elements in the column means contacted by said advance of said step-by-step switching means, which are located at the intersection with said determined group of line means, thereby effecting the complete storage of the binary code value corresponding to the decadic digit whose key has been actuated, at the advance of said step-by-step switching means by a single step.

4. The improvement as described in claim 3, wherein said step-by-step switching means is a rotary selector switch having a plurality of arcs.

5. The improvement as described in claim 3, wherein said step-by-step switching means is a rotary selector switch comprising several arcs, certain of said arcs being connected to said storage register for selection of the column means of said storage register, and certain of said arcs being connected for the control of the process of storing a sequence of decadic digits and the actuation of signalling means indicating the progress of the storing process.

6. The improvement as described in claim 3, wherein said step-by-step switch is a rotary selector switch comprising several arcs, and further comprising a step-wise switching device for reading out information from said storage device and comprising step elements equal in number to the column means of said storage register, one arc of said rotary selector switch being associated with the step elements of said reading-out switching device.

7. The improvement as described in claim 3, wherein said step-by-step switch is a rotary selector switch comprising several arcs, and further comprising an electronic ring counter for reading out information from said storage device and comprising step elements equal in number to the column means of said storage register, one arc of said rotary selector switch being associated with the step elements of said electronic ring counter.

8. The improvement as described in claim 3 further comprising an input interrupting device which blocks insertion of the decadic digits of numbers containing two groups of successive decadic digits separated by a comma sign, as soon as the group of decadic digits preceding the comma, in time, has been read into the input system.

9. In an input system for loading data in the form of decadic numbers into an electronic computer, in which the decadic digits inserted in a ten-key keyboard, each key of which keyboard corresponds to one of the decadic digits 0, 1, 2, . . . 8, 9, are transferred after temporary storage in binary-coded form as successive pulse groups to the calculating section of the computer, the movement of, in combination, ten contactor switch sets each of which comprises contactors and is associated with one of the ten keys of said keyboard, a matrix storage register comprising four line means and a plurality of column means and a bi-stable storage element at each intersection of one of said line means with one of said column means, at least one rotary selector switch adapted for step-wise advance and comprising a plurality of arcs of terminals and at least one wiper associated with each arc, at least one set of double acting relay means, and a control circuit connecting said contactor switch means to said four line means and to one of said arcs of terminals via said relay means so that upon actuation of one of said keys of said keyboard certain contactors of the respective associated contactor switch set established current flow through a determined group of said four line means corresponding to a binary code value equivalent to the decadic digit corresponding to the actuated key and, simultaneously, certain contactors of said last-mentioned set advance all wipers of said rotary selector switch by the computer distance between the arc terminals at a time, one of said wipers contacting a terminal connected to those of the storage elements in the column means, which are located at the intersection with said determined group of line means to energize said storage elements thereby effecting the complete storage of the binary code value corresponding to the decade digit whose key has been actuated at the advance of said rotary selector switch by a single step, and an input interrupting device for blocking insertion of the decadic digits of numbers containing two groups of successive decadic digits separated by a comma sign as soon as the group of decadic digits preceding the comma, has been read into the input system.

10. In an input system for loading data in the form of decadic numbers into an electronic computer, in which the decadic digits inserted in a ten-key keyboard each key of which keyboard corresponds to one of the decadic digits 0, 1, 2, . . . 8, 9, are transferred after temporary storage in binary coded form as successive pulse groups to the calculating section of the computer, the improvement of, in combination, ten contactor switch sets each of which comprises contactors and is associated with one of the ten keys of said keyboard, a matrix storage register comprising four line means and a plurality of column means and a bi-stable storage element at each intersection of one of said line means with one of said column means; at least one rotary selector switch adapted for step-wise advance and comprising a plurality of arcs of terminals and at least one wiper associated with each arc, at least one set of double acting relay means, and a control circuit connecting said contactor switch means to said line means and to at least one of said arcs of terminals via said relay means so that upon actuation of one of said keys of said keyboard certain contactors of the respective associated contactor switch set establish current flow through a determined group of said four line means corresponding to a binary code value equivalent to the decadic digit corresponding to the actuated key and, simultaneously, certain contactors of said last-mentioned set advance all wipers of said rotary selector switch by the angular distance between two arc terminals at a time, one of said advancing wipers contacting those of the storage elements in the column located at the intersection with said determined group of line means to energize said storage elements, thereby effecting the complete storage of the binary code value corresponding to the decadic digit whose key has been actuated, at the advance of said rotary selector switch by a single step.

11. The improvement described in claim 10, further comprising an input interrupting device adapted for blocking insertion of the decadic digits of numbers containing two groups of successive decadic digits separated by a comma sign, as soon as the group of decadic digits preceding the comma, in time, has been read into the input system.

12. The improvement described in claim 10, further comprising an input interrupting device adapted for blocking insertion of the decadic digits of numbers containing two groups of successive decadic digits separated by a comma sign, as soon as the group of decadic digits preceding the comma, in time, has been read into the input system, and comprising at least one of said wipers of said rotary selector switch being an interrupting wiper disposed to make contact on one of said arcs at an angular displacement relative to at least one other of said wipers.

13. The improvement described in claim 10, further comprising an input interrupting device adapted for blocking insertion of the decadic digits of numbers containing two groups of successive decadic digits separated by a comma sign, as soon as the group of decadic digits preceding the comma, in time, has been read into the input system, and comprising at least one of said wipers of said rotary selector switch being an interrupting wiper disposed to make contact on one of said arcs at an angular displacement relative to at least one other of said wipers, and blocking relay means adapted for interrupting the advance of said wipers, when said interrupting wiper reaches a determined contact position on said arc prepared for interruption by previous contact with one of said other wipers.

14. The improvement described in claim 13, further comprising comma insertion key means adapted for influencing said blocking relay means so as to remove the blocking of the input of further digits.

15. The improvement described in claim 13, further comprising comma insertion key means adapted for influencing said blocking relay means so as to remove the blocking of the input of further digits, and a second blocking relay set for renewed interruption of the input of decadic digits, said second blocking relay being prepared for effecting said renewed interruption when said comma insertion key means are actuated.

16. The improvement described in claim 14, further comprising multi-stage ring counter means for reading information out of said storage register, and adjustable by actuation of said comma insertion key means to begin counting, during a reading-out process, at a determined stage of said ring counter means.

17. The improvement described in claim 10, wherein said rotary selector switch comprises two switching groups each adapted for step-wise operation independent of the other.

18. The improvement described in claim 10, wherein said rotary selector switch comprises two switching groups each adapted for step-wise operation independent of the other and wherein said switching groups each comprise a step magnet and at least one arc of terminals, and wherein self-interrupting contact means are provided with each of said switching group step magnets.

19. The improvement described in claim 10, wherein said rotary selector switch comprises two switching groups each adapted for step-wise operation independent of the other and wherein said switching groups each comprise a step magnet and at least one arc of terminals, and wherein self-interrupting contact means are provided with each of said switching group step magnets, wherein one of said switching groups comprises said arcs and wipers pertaining to said input interrupting device, and wherein the other switching group comprises the remaining arcs and wipers, serving for storing and reading out information of said storage register.

20. The improvement described in claim 17, further comprising a comma insertion stage selector switch adjustable to a desired position in which a comma is to be inserted by means of said comma insertion key means.

21. The improvement described in claim 17, further comprising a comma insertion stage selector switch adjustable to a desired position in which a comma is to be inserted by means of said comma insertion key means, wherein one of said arcs of terminals of said switching group pertaining to said input interrupting device is linked up with said comma insertion stage selector switch, so that adjustment of the latter switch selects, at will, one terminal of said one arc at which a comma will be inserted; comma preselection key means, actuation of which causes said switching group pertaining to said input interrupting device to rotate independently of said other switching group until one of said arcs rotated thereby interrupts the step-wise operation of the step-magnet pertaining to said former switching group, whereby a phase displacement between the wipers of both groups is attained, which displacement determines the position of the comma.

References Cited in the file of this patent

UNITED STATES PATENTS

| | | |
|---|---|---|
| 2,647,689 | Bowyer | Aug. 4, 1953 |
| 2,702,380 | Brustman | Feb. 15, 1955 |
| 2,931,014 | Buchholz | Mar. 29, 1960 |

OTHER REFERENCES

Publication: IBM Publication, Ramac 305, copyright 1958.